United States Patent
Richards

[15] 3,643,979
[45] Feb. 22, 1972

[54] SNOWMOBILE SKI CONSTRUCTION

[72] Inventor: William R. Richards, Roseau, Minn.
[73] Assignee: Textron Inc., Providence, R.I.
[22] Filed: Dec. 15, 1969
[21] Appl. No.: 885,091

[52] U.S. Cl.................................................................280/28
[51] Int. Cl........................................................B62b 17/02
[58] Field of Search.....................280/28, 12; 9/11, 11.13 L, 9/11.13 ML; 296/31 P

[56] References Cited

UNITED STATES PATENTS

| | | | |
|---|---|---|---|
| 2,539,817 | 1/1951 | Ditter | 280/28 |
| 2,730,772 | 1/1956 | Jones | 296/31 P |
| 2,858,580 | 11/1958 | Thompson et al. | 296/31 P |
| 2,961,362 | 11/1960 | Landes | 280/28 |
| 3,453,000 | 7/1969 | Asher | 280/18 |
| 3,208,761 | 9/1965 | Sullivan et al. | 280/11.13 LM |
| 3,276,784 | 10/1966 | Anderson, Jr. | 280/11.13 LM |
| 3,416,810 | 12/1968 | Kennedy | 280/11.13 LM |

*Primary Examiner*—Kenneth H. Betts
*Assistant Examiner*—Robert R. Song
*Attorney*—Merchant & Gould

[57] ABSTRACT

The disclosure is directed to a snowmobile ski of laminated construction, having an abrasion-resistant outer skin and an inner polyurethane fill bonded to the outer skin. An arcuate metal rod runs along the midline of the ski, bowing from the bottom surface of the ski to provide an abrasion-resistant runner to enhance control of the vehicle.

3 Claims, 5 Drawing Figures

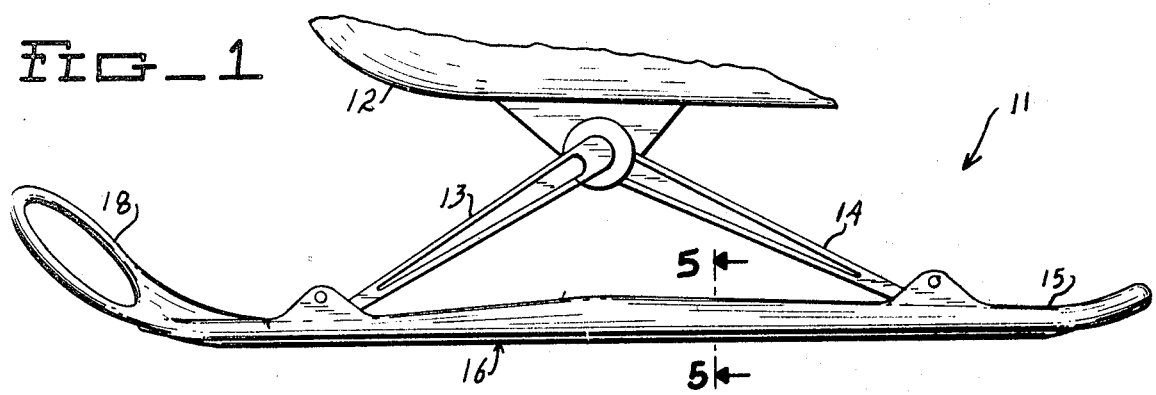
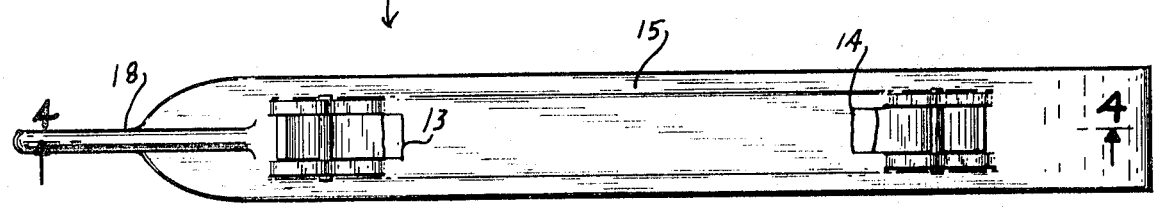
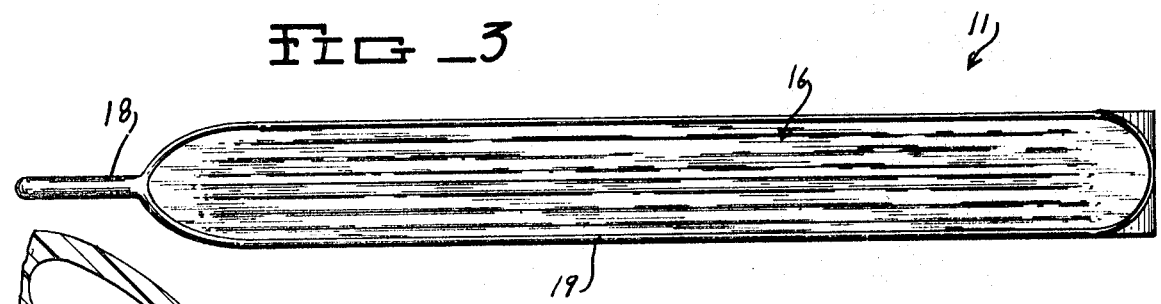
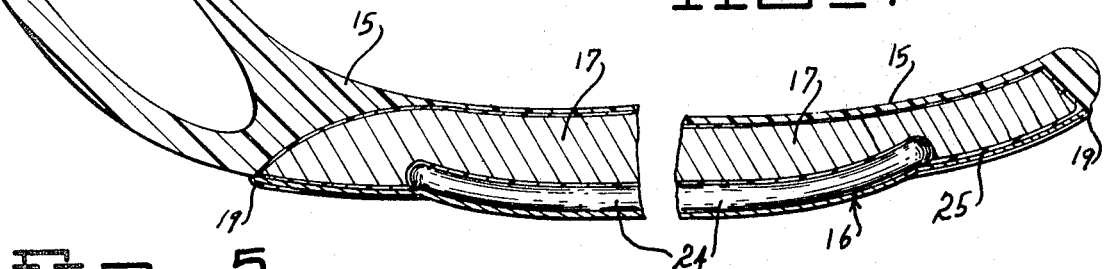
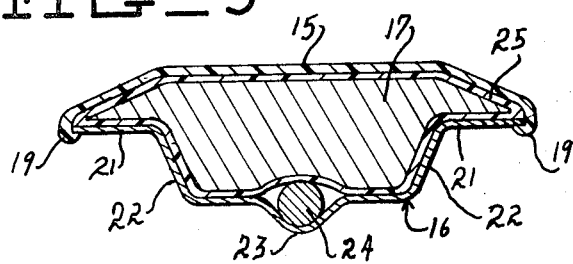

SNOWMOBILE SKI CONSTRUCTION

The invention falls within the art of snowmobile skis, and is specifically directed to a laminated construction for such a ski.

A problem that snowmobile manufacturers continually face is that of keeping weight of the vehicle down. Other than the obvious difficulty of power/weight ratio, the snowmobile designer must also be mindful of "floatation" of the vehicle i.e., its ability to rest or ride on top of the bed of snow. Clearly, the efficiency and performance characteristics of a snowmobile are lessened considerably when, because of excessive weight, it rides well below the snow surface.

Snowmobile skis are presently formed from heavy metal plate, which is strong but both heavy and relatively inflexible. Thus, it adds to, rather than helps to solve, the overall weight problem, and is less than desirable insofar as performance characteristics are concerned.

My invention is, therefore, directed to a laminated ski construction the primary purpose of which is to provide a snowmobile ski that is far lighter than existing skis without sacrificing overall strength. Additional features resulting from this particular construction are flexibility, which gives a smoother ride, and the specific type of guides on the ski undersurface, which provide better snowmobile control.

BRIEF DESCRIPTION OF THE DRAWINGS

FIG. 1 is a side view of a snowmobile ski employing the inventive laminated construction;

FIG. 2 is a top view of the laminated snowmobile ski;

FIG. 3 is a bottom view of the laminated snowmobile ski;

FIG. 4 is a side sectional view of the laminated snowmobile ski taken along the line 4—4 of FIG. 2; and FIG. 5 is a cross-sectional view of the laminated snowmobile ski taken along the line 5—5 of FIG. 1.

DESCRIPTION OF THE PREFERRED EMBODIMENTS

FIG. 1 discloses a snowmobile ski 11 of laminated construction connected to a snowmobile 12 by means of a pair of torsional suspension members 13, 14.

Referring additionally to FIGS. 2–5, with particular attention being drawn to the sectional figures 4 and 5, it can be seen that ski 11 consists of an outer skin made of a top layer 15 and a bottom layer 16 joined to form an elongated opening filled with rigid or semirigid material 17.

The material from which top skin 15 is formed comes from a family of high-strength plastics, and is preferably made from a polycarbonate or acrylonitrile-butadiene-styrene (ABS). As best seen in FIG. 4, top skin 15 thickens at the leading and trailing tips for reinforcement purposes. The leading tip forms a conventional loop 18 which prevents the tip from bending back and collapsing when excessive forces are encountered. As best seen in FIG. 5, top skin 15 is flat across the top and has downwardly extending sides terminating in curled tips 19 which are constructed to receive bottom skin 16. Obviously, this is only one method of joining skin 15 and 16; other structural arrangements are both possible and practical.

Bottom skin 16 is formed from a high-strength, abrasion-resistant alloy, preferably stainless steel. As best seen in FIG. 5 the outer edges 21 of bottom skin 16 which are received by curled tips 19 lie in an essentially horizontal plane, and turn downward to merge in a second horizontal plane and form a stepped portion 22 which serves as an elongated guiding member or runner. The bottom surface of stepped portion 22 is generally flat, but includes a hump 23 at its midline in order to receive a stabilizing rod 24. As best seen in FIG. 4, rod 24 is arcuately shaped with respect to its length and runs essentially the full length of the snow-contacting undersurface of ski 11. Rod 24 is disposed so that it bows downwardly from the bottom surface of ski 11, thus necessitating the hump 23. As such, rod 24 and hump 23 form an additional runner along the bottom of ski 11 which enhances control of snowmobile 12 both during straight-line and curved movement. Preferably, rod 24 is cold rolled steel and is spot welded or otherwise affixed to bottom skin 16 along the inner surface of hump 23.

Inner fill 17 comes from the family of cellular plastic foams, and preferably is polyurethane foam. In order to give ski 11 unified strength, fill 17 is bonded to top skin 15 and bottom skin 16 over the entire length of ski 11. This is best effected by bonding a lining 25 of reinforced polyester resin over the entire inner surface of the elongated opening formed by top skin 15 and bottom skin 16, and thereafter adding the polyurethane fill 17 in bonded relation with lining 25.

The overall thickness of the ski can be varied along its length to achieve desired flex characteristics. For example, in FIG. 1, ski 11 reaches its maximum thickness at approximately the midpoint and thins toward the leading and trailing tips.

The described laminated construction gives rise to an abrasion-resistant snowmobile ski of exceptional strength and durability. By virtue of the materials and construction used, the ski is more flexible and therefore more capable of absorbing shocks while offering a smoother ride.

What is claimed is:

1. A snowmobile ski, comprising:
   a snow-engaging bottom skin formed from a thin layer of abrasion-resilient metal;
   a top skin formed from high-strength plastic, the top skin being joined with the bottom skin to form an elongated opening therebetween; the elongated opening being filled with cellular plastic foam, the foam being bonded to the inner surface of the top and bottom skins; and
   a longitudinal member arcuately formed and carried by the bottom skin to bow downward from the general undersurface of the ski.

2. The ski as defined by claim 1, wherein the arcuately formed longitudinal member is affixed to the top surface of the bottom skin, the bottom skin conforming to the shape of said member.

3. The ski as defined by claim 1, wherein the arcuately formed longitudinal member comprises a cold-rolled steel rod.

* * * * *